UNITED STATES PATENT OFFICE.

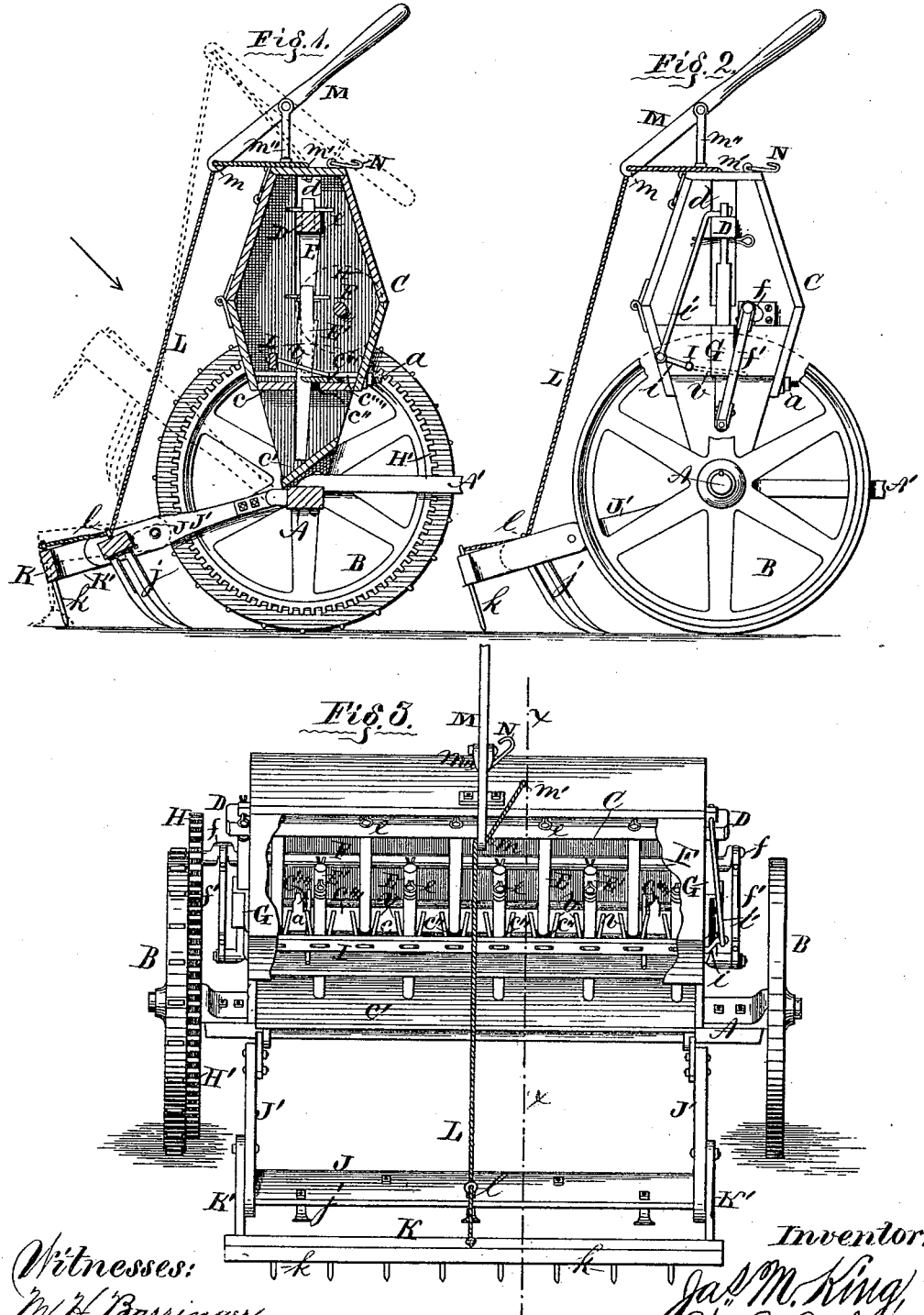

JAMES M. KING, OF SWAN CREEK, ILLINOIS.

IMPROVEMENT IN SEEDING-MACHINES.

Specification forming part of Letters Patent No. 185,331, dated December 12, 1876; application filed September 12, 1876.

*To all whom it may concern:*

Be it known that I, JAMES M. KING, of Swan Creek, in the county of Warren and State of Illinois, have invented certain new and useful Improvements in Seeding - Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention relates to improvements in seeding-machines of that class used for sowing the small grains broadcast; and the invention consists in the construction and combination of parts hereinafter fully described, and set forth in the claims.

In the accompanying drawing, Figure 1 is a sectional view of a machine embodying my invention in the line $x$ $x$ of Fig. 3. Fig. 2 is a side elevation, and Fig. 3 is a perspective view, partly broken away to show the interior.

Referring to the parts by letters, A represents an axle on which the operating parts are mounted, and is supported on wheels B B, and has a draft-pole, A'. C is the box in which the seed is carried, and has a bottom, $c$, with an inclined board, $c'$, seated below it. The bottom $c$ is perforated with holes $c''$, the size of which may be regulated by a slide-plate, $c'''$, which is held in place by rods $c''''$, and moved to and from the holes $c''$ by screw-rods $a$. D is a head or bar, extending across the box $c$, and outward through vertical slots $d$ in the end of the box. The head D is pierced with holes, in which the upper end of the force feed-teeth E are secured by a shoulder below the head D, and a pin, $e$, which passes through the teeth above the head D. F is a shaft, extending across and beyond the box C, and has a crank, $f$, on each end, from which a rod, $f'$, extends downward, and connects at its lower end with the lower end of a reciprocating bar, G, the upper end of which is connected to the head D. H is a pinion on the shaft F, gearing with a spur-wheel, H', on the wheel B.

It will be seen that rotation of the wheel B, by impact with the ground as the machine advances, will give a vertical reciprocating motion to the force feed-teeth E, the lower ends of which pass into the holes $c''$ in their descent, and force the seeds through, and thus prevent clogging of the seed-passages.

If desired, any portion of the teeth E may be removed from the head D by removing the pin $e$, and those removed may be inserted in their respective holes $c''$ to close them, as shown by teeth E'.

I is a rock-shaft, extending across the box C, and has a crank, $i'$, on one end, connected by a rod, $i'$, with the end of the head D. The shaft I has a series of projecting cleaner-teeth, $v$, between and close to each feed-tooth E. As the teeth E are elevated the teeth $v$ are struck downward by their connection with the head D, and thus clear or clean them from all adhering chaff or straw. At the same time they act as stirrers to keep seeds of certain classes from packing. The board $c'$ serves to spread evenly the seed as it falls thereon, and discharge it evenly in close proximity to the surface of the ground, so that the wind will have but a minimum effect in disturbing their descent.

J is a bar, provided with harrow-teeth $j$, and hinged by bars J' to the axle A, and K is a similar bar, with teeth $k$, and is hinged by bars K' to the bar J. L is a cord, attached to the central part of the bar K, and, passing through an eye, $l$, on the bar J, is carried upward through an eye, $m$, in one end of a lever, M, and thence to an attachment, $m'$, on top of the box C. The lever M is fulcrumed on a standard, $m''$, on top of box C.

It will be seen that either harrow-head J or K may rise and fall independent of the other, their cord-connection permitting the same, and at the same time being such that when drawn on by the lever M, both harrows will be elevated at once and together, as shown by dotted lines at Fig. 1. The attachment of the cord L to the lever M and box C is also such that only one-half of the power is required to raise the harrows that would be required if the cord was attached directly to the lever M.

N is a hook, which may be used to hold the lever M in the position shown by dotted lines at Fig. 1, and the harrows elevated. The harrows are shown in full lines in the drawings in position for covering the seed.

Having thus described my invention, what I claim as new, and desire to secure by Letters Patent, is—

1. In a seeding-machine, the cleaner-teeth $v$ and shaft I, arranged to operate with the feeding-teeth E, substantially as described, and for the purpose specified.

2. In a seeding-machine, the cleaner-teeth $v$, shaft I, connected by rod $i'$ to the head D, combined to operate with the teeth E, holes $c''$, and head D, substantially as described, and for the purpose specified.

3. The combination of the harrows J K, cord L, and lever M, the cord secured to the harrow-head K, and passing loosely through an eye, $l$, in the head J, as described, the harrows having free independent motion when in use, and being simultaneously elevated by the lever when not required for use, substantially as set forth.

In testimony that I claim the foregoing as my own I affix my signature in presence of two witnesses.

JAMES M. KING.

Witnesses:
WILLIAM A. WILKINS,
THOS. McKEE.